(12) United States Patent
Kobayashi et al.

(10) Patent No.: US 12,083,518 B2
(45) Date of Patent: Sep. 10, 2024

(54) FLUIDIC DEVICE AND SYSTEM

(71) Applicant: NIKON CORPORATION, Tokyo (JP)

(72) Inventors: Ryo Kobayashi, Kawasaki (JP);
Tetsuomi Takasaki, Sagamihara (JP);
Naoya Ishizawa, Saitama (JP); Taichi Nakamura, Nagano (JP)

(73) Assignee: NIKON CORPORATION, Tokyo (JP)

( * ) Notice: Subject to any disclaimer, the term of this patent is extended or adjusted under 35 U.S.C. 154(b) by 926 days.

(21) Appl. No.: 17/256,156

(22) PCT Filed: Jun. 29, 2018

(86) PCT No.: PCT/JP2018/024917
§ 371 (c)(1),
(2) Date: Jul. 19, 2021

(87) PCT Pub. No.: WO2020/003526
PCT Pub. Date: Jan. 2, 2020

(65) Prior Publication Data
US 2021/0346886 A1 Nov. 11, 2021

(51) Int. Cl.
*B01L 3/00* (2006.01)
(52) U.S. Cl.
CPC ... *B01L 3/502738* (2013.01); *B01L 3/502707* (2013.01); *B01L 2200/0684* (2013.01); *B01L 2400/06* (2013.01)
(58) Field of Classification Search
CPC ..... B01L 2200/0605; B01L 2200/0684; B01L 2300/0816; B01L 2300/0874;
(Continued)

(56) References Cited

U.S. PATENT DOCUMENTS

2019/0134860 A1  5/2019  Ishizawa et al.

FOREIGN PATENT DOCUMENTS

| JP | 2006234536 A | 9/2006 |
|---|---|---|
| JP | 2007225438 A | 9/2007 |

(Continued)

OTHER PUBLICATIONS

International Search Report for International Application No. PCT/JP2018/024917 mailed Aug. 21, 2018; with English translation, 4 pages.

(Continued)

*Primary Examiner* — Jennifer Wecker
(74) *Attorney, Agent, or Firm* — Squire Patton Boggs (US) LLP

(57) ABSTRACT

An object of the present invention is to provide a flow path device capable of suppressing an occurrence of air bubbles when a solution is introduced into a flow path. A fluidic device has a pair of substrates which are stacked in a thickness direction, one substrate including a flow path formed by being covered with the other substrate. The flow path includes a merging/branching portion which is surrounded by a contour which is configured to match each line segment connecting together apex positions of an equilateral triangle as viewed in the thickness direction or a contour parallel to each line segment and in which solution merges or branches. A valve which is configured to regulate flow of a fluid in the flow path is provided in at least two of the apex positions.

12 Claims, 10 Drawing Sheets

(58) Field of Classification Search
CPC ......... B01L 2400/0487; B01L 2400/06; B01L 2400/0622; B01L 2400/0655; B01L 3/502707; B01L 3/502738; F16K 2099/008; F16K 2099/0084; F16K 99/0015; F16K 99/0028; G01N 35/08; G01N 37/00
See application file for complete search history.

(56) References Cited

FOREIGN PATENT DOCUMENTS

| | | | |
|---|---|---|---|
| JP | 2014-038018 A | 2/2014 | |
| WO | WO 2018/012429 A1 | 1/2018 | |
| WO | WO-2019116422 A1 * | 6/2019 | .......... B01F 13/0059 |

OTHER PUBLICATIONS

Written Opinion of the International Searching Authority for International Application No. PCT/JP2018/024917 mailed Aug. 21, 2018; with English translation, 10 pages.

Hong, et al.: "A nanoliter-scale nucleic acid processor with parallel architecture", Nature Biotechnology Letters; Apr. 2004 (online Mar. 14, 2004); vol. 22(4), pp. 435-439.

Notice of Reasons for Rejection issued for Japanese Patent Application No. 2020-527156 mailed Jun. 28, 2022; with English translation, 9 pages.

* cited by examiner

FLUIDIC DEVICE AND SYSTEM

CROSS-REFERENCE

This application is a 35 USC 371 national phase filing of PCT/JP2018/024917, filed Jun. 29, 2018.

TECHNICAL FIELD

The present invention relates to a fluidic device and a system.

BACKGROUND

In recent years, attention has been focused on a development of micro-total analysis systems (μ-TAS) and the like aimed at high speed, high efficiency, and integration of tests in the field of in vitro diagnostics, or ultra-miniaturization of testing equipment, and active research has proceeded worldwide.

A μ-TAS is superior to conventional inspection equipment in that measurement and analysis can be performed with a small amount of a sample and that the μ-TAS can be carried and is disposable at a low cost.

Furthermore, the μ-TAS is receiving attention as a highly useful method when using expensive reagents or when testing a small amount of multiple samples.

A device including a flow path and a pump disposed on the flow path has been reported as a component of a μ-TAS (Non-Patent Document 1). In such a device, a plurality of solutions are injected into the flow path and the pump is operated to mix the plurality of solutions in the flow path.

RELATED ART DOCUMENTS

Non-Patent Document

[Non-Patent Document 1] Jong Wook Hong, Vincent Studer, Giao Hang, W French Anderson and Stephen R Quake, Nature Biotechnology 22, 435-439 (2004)

SUMMARY OF INVENTION

According to a first aspect of the present invention, there is provided a fluidic device which has a pair of substrates which are stacked in a thickness direction, one substrate including a flow path formed by being covered with the other substrate, wherein the flow path includes a merging/branching portion which is surrounded by a contour which is configured to match each line segment connecting together apex positions of an equilateral triangle as viewed in the thickness direction or a contour parallel to each line segment and in which a solution merges or branches, and a valve which is configured to regulate flow of a fluid in the flow path is provided in at least two of the apex positions.

According to a second aspect of the present invention, there is provided a system including: the fluidic device of the first aspect of the present invention; and a supply unit which is able to independently supply a force for deforming the valve for each valve when set in the fluidic device.

DESCRIPTION OF EMBODIMENTS

Figure 1:
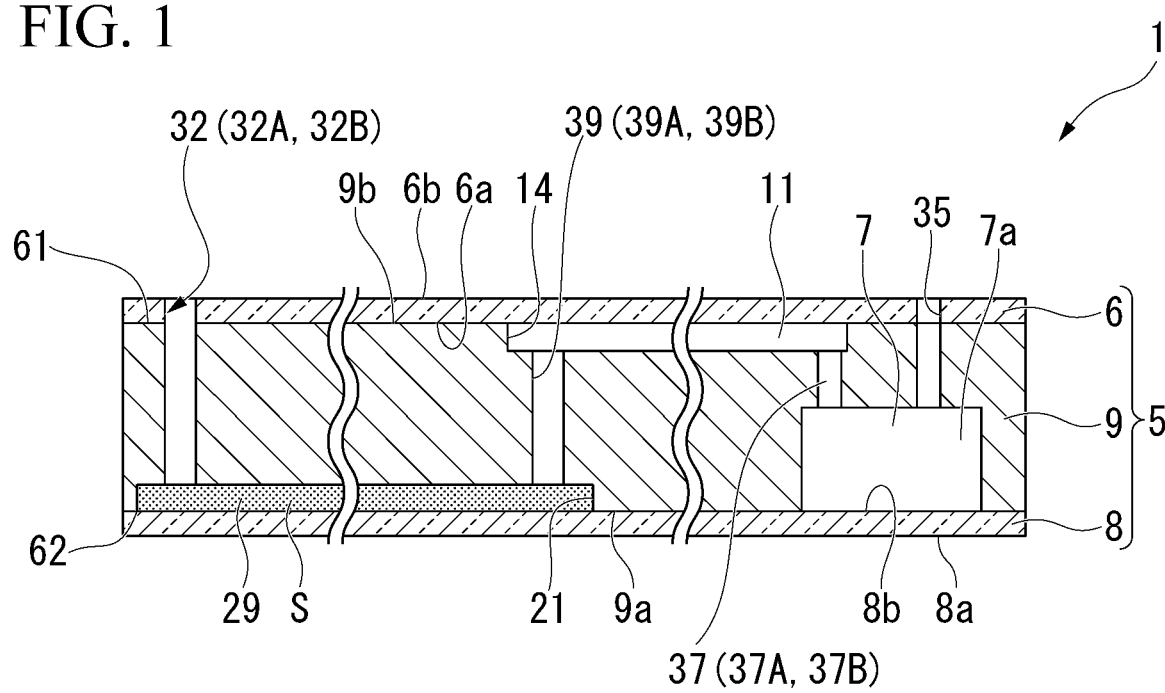
FIG. 1 is a cross-sectional view schematically showing a fluidic device of an embodiment.

Hereinafter, embodiments of the fluidic device and system of the present invention will be described with reference to FIGS. 1 to 6. In addition, in the drawings used in the following description, in order to make the features easy to understand, in some cases, the featured parts may be enlarged for convenience, and dimensional ratios or the like of the components may not be the same as the actual ones.

Figure 2:
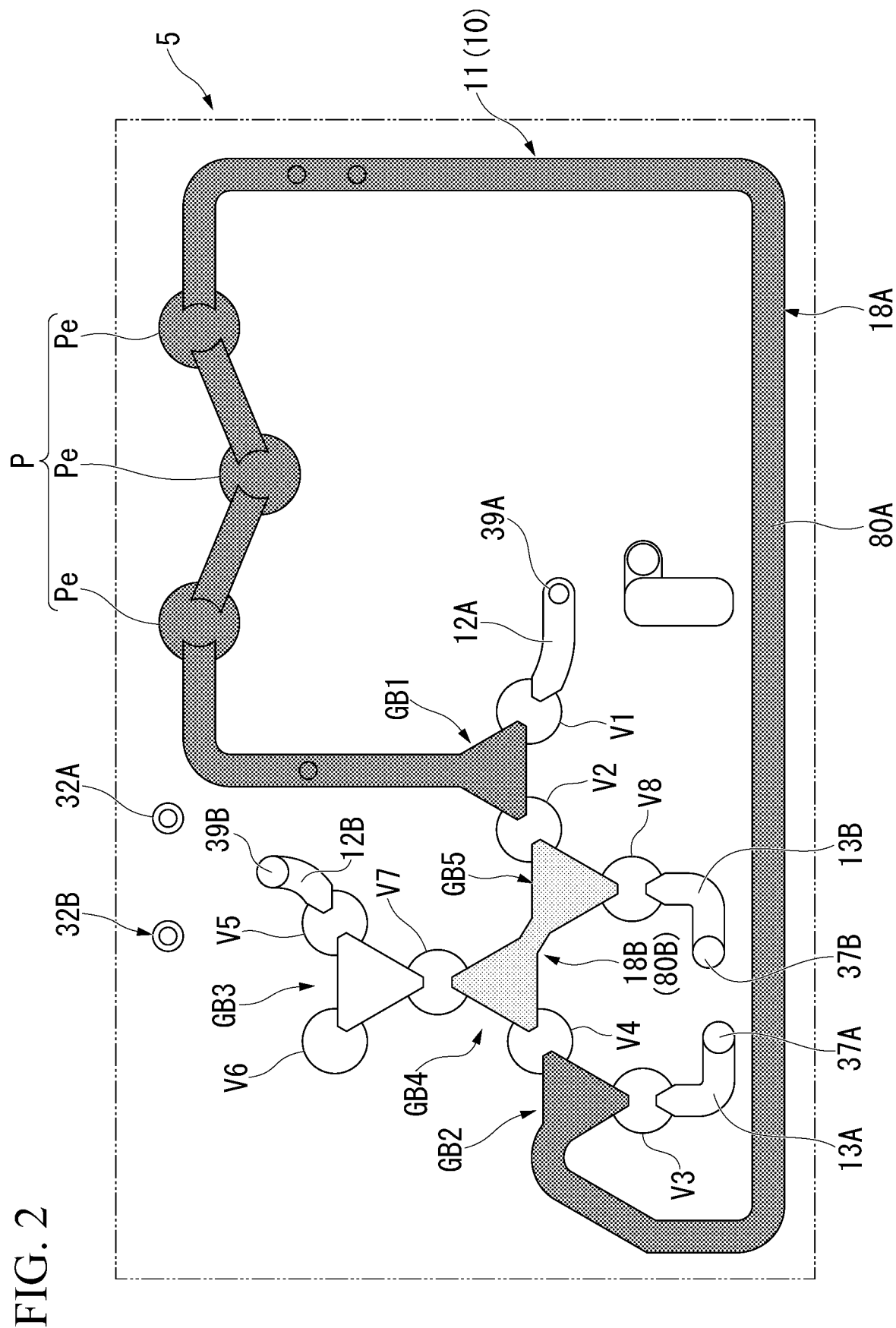
FIG. 2 is a plan view schematically showing the fluidic device of the embodiment.

FIG. 1 is a schematic cross-sectional view of a fluidic device 1 of the present embodiment. FIG. 2 is a plan view schematically showing an example of a flow path provided in the fluidic device 1. Also, in FIG. 2, a transparent upper plate 6 is shown in a state in which each portion disposed on the lower side is transparent.

The fluidic device 1 of the present embodiment includes a device that detects a sample substance to be detected stored in a specimen sample by an immune reaction, an enzymatic reaction, or the like. The sample substance is, for example, a biomolecule such as nucleic acid, DNA, RNA, a peptide, a protein, or an extracellular endoplasmic reticulum.

As shown in FIG. 2, the fluidic device 1 includes a base material 5 and a plurality of valves V1 to V8. Further, as shown in FIG. 1, the base material 5 has three substrates (a first base material 6, a second base material 9, and a third base material 8) stacked in a thickness direction. The first base material 6, the third base material 8, and the second base material 9 of the present embodiment are made of a resin material. Examples of the resin material constituting the first base material 6, the third base material 8 and the second base material 9 include polypropylene, polycarbonate and the like. Further, in the present embodiment, the first base material 6 and the third base material 8 are made of a transparent material. The materials constituting the first base material 6, the third base material 8, and the second base material 9 are not limited.

In the following description, it is assumed that the first base material (e.g., first substrate (substrate), a lid, an upper part or a lower part of the flow path, an upper face or a bottom face of the flow path) 6, the third base material (e.g., a third substrate (substrate), a lid, an upper part or a lower part of the flow path, an upper face or a bottom face of the flow path) 8, and the second base material (a second substrate) 9 are disposed along a horizontal plane, the first base material 6 is disposed above the second base material 9, and the third base material 8 is disposed below the second base material 9. However, this merely defines a horizontal direction and a vertical direction for convenience of explanation, and does not limit the orientation when the fluidic device 1 according to the present embodiment is used.

The first base material 6, the second base material 9, and the third base material 8 are plate materials extending in the horizontal direction. The first base material 6, the second base material 9, and the third base material 8 are stacked in this order in the vertical direction. The second base material 9 is stacked on the first base material 6 under the first base material 6. Further, the third base material 8 is stacked on the second base material 9 on a face (a lower face 9a) opposite to the first base material 6.

In the following description, a direction in which the first base material 6, the second base material 9, and the third base material 8 are stacked is simply referred to as a stacking direction. In the present embodiment, the stacking direction is the vertical direction. Further, in the present embodiment, the stacking direction is the thickness direction of the substrate (the first base material 6, the second base material 9, and the third base material 8).

The first base material 6 has an upper face 6b and a lower face 6a. The second base material 9 has an upper face 9b and a lower face 9a. Similarly, the third base material 8 has an upper face 8b and a lower face 8a.

The lower face 6a of the first base material 6 faces and is in contact with the upper face 9b of the second base material 9 in the stacking direction. The lower face 6a of the first base material 6 and the upper face 9b of the second base material 9 are joined to each other by a joining means such as adhesion. The lower face 6a of the first base material 6 and the upper face 9b of the second base material 9 form a first boundary face 61. That is, the first base material 6 and the second base material 9 are joined at the first boundary face 61.

Similarly, the upper face 8b of the third base material 8 faces and is in contact with the lower face 9a of the second base material 9 in the stacking direction. The upper face 8b of the third base material 8 and the lower face 9a of the second base material 9 are joined to each other by a joining means such as adhesion. The upper face 8b of the third base material 8 and the lower face 9a of the second base material 9 form a second boundary face 62. That is, the second base material 9 and the third base material 8 are joined at the second boundary face 62.

The base material 5 is provided with an injection hole 32, a reservoir 29, a flow path 11, a waste liquid tank 7, a discharge hole 37, an air hole 35, and a supply hole 39.

The injection hole 32 penetrates the first base material 6 and the second base material 9. The injection hole 32 is connected to a reservoir 29 located at a boundary portion between the second base material 9 and the third base material 8. The injection hole 32 connects the reservoir 29 to the outside. The solution is filled in the reservoir 29 via the injection hole 32. One injection hole 32 is provided for one reservoir 29. In addition, in FIG. 2, the injection hole 32 is not shown.

The reservoir 29 is a space formed in a tube shape or a tubular shape surrounded by an inner wall face of the groove 21 provided on the lower face 9a of the second base material 9 and the third base material 8. That is, the reservoir 29 is located at the second boundary face 62. A plurality of reservoirs 29 are provided on the base material 5 of the present embodiment. The solution is stored in the reservoir 29. The plurality of reservoirs 29 store the solution independently of each other. The reservoir 29 supplies the stored solution to the flow path 11. The reservoir 29 of this embodiment is a flow path type reservoir. One end of the reservoir 29 in a longitudinal direction is connected to the injection hole 32. The supply hole 39 is connected to the other end of the reservoir 29 in the longitudinal direction.

In the present embodiment, a case where the groove 21 is provided in the second base material 9 and the reservoir 29 is formed by covering an opening of the groove 21 with the third base material 8 has been described. However, the reservoir 29 may be configured by covering the opening of the groove provided in the third base material 8 with the second base material 9.

The flow path 11 is a space formed in a tube shape or a tubular shape surrounded by an inner wall face of a groove 14 provided on the upper face 9b of the second base material 9 as one substrate and the first base material 6 as the other substrate. That is, the flow path 11 is located at the first boundary face 61. A solution is supplied to the flow path 11 from the reservoir 29. The solution flows in the flow path 11.

Further, in the present embodiment, a case where the groove portion 14 is provided in the second base material 9 and the flow path 11 is formed by covering the opening of the groove portion 14 with the first base material 6 has been described. However, the flow path 11 may be configured by covering the opening of the groove provided in the first base material 6 with the second base material 9. That is, the base material 5 has a pair of substrates stacked in the thickness direction, and the flow path 11 may be configured by covering a groove provided on one of the pair of substrates with the other substrate.

Each part of the flow path 11 will be described later in detail on the basis of FIG. 2.

The supply hole 39 is provided in the second base material 9. The supply hole 39 penetrates the second base material 9 in a plate thickness direction. The supply hole 39 connects the reservoir 29 and the flow path 11. The solution stored in the reservoir 29 is supplied to the flow path 11 via the supply hole 39. That is, the reservoir 29 is connected to the flow path 11 via the supply hole 39.

The waste liquid tank 7 is provided on the base material 5 to dispose of the solution in the flow path 11. The waste liquid tank 7 is formed by a space surrounded by an inner wall face of a recess 7a provided on the lower face 9a side of the second base material 9 and a third base material 8 that covers an opening facing the lower side of the recess 7a.

The discharge hole 37 is provided in the second base material 9. The discharge hole 37 penetrates the second base material 9 in the plate thickness direction. The discharge hole 37 connects the waste liquid tank 7 and the flow path 11. The solution in the flow path 11 is discharged to the waste liquid tank 7 via the discharge hole 37. That is, the waste liquid tank 7 is connected to the flow path 11 via the discharge hole 37.

The air hole 35 penetrates the first base material 6 and the second base material 9. The air hole 35 is connected to the waste liquid tank 7. The air hole 35 connects the waste liquid tank 7 to the outside. That is, the waste liquid tank 7 is opened to the outside via the air hole 35.

Next, the flow path 11 will be described more specifically.

As shown in FIG. 2, the flow paths 11 include a circulation flow path 10, a plurality of (two in the example of FIG. 2) introduction flow paths 12A and 12B, and a plurality of (two in the example of FIG. 2) discharge flow paths 13A and 13B, and the like. A solution is introduced into the flow path 11 from the reservoir 29 (see FIG. 1).

The circulation flow path 10 is configured in a loop shape when viewed from the stacking direction. A pump P and a plurality of (five in the example of FIG. 2) substantially equilateral triangular merging/branching portions GB1 to GB5 in which solutions are merged or branched are disposed in the flow path of the circulation flow path 10. The pump P is made up of three element pumps Pe disposed side by side in the flow path. The element pumps Pe are so-called valve pumps. The pump P can convey the liquid in the circulation flow path by sequentially opening and closing the three element pumps Pe. The number of element pumps Pe constituting the pump P may be four or more.

Each of the merging/branching portions GB1 to GB5 in the present embodiment is provided to be configured so that one (the second substrate 9) of the pair of substrates (the first substrate 6 and the second substrate 9) is covered with the other substrate (the first substrate 6).

Figure 3:
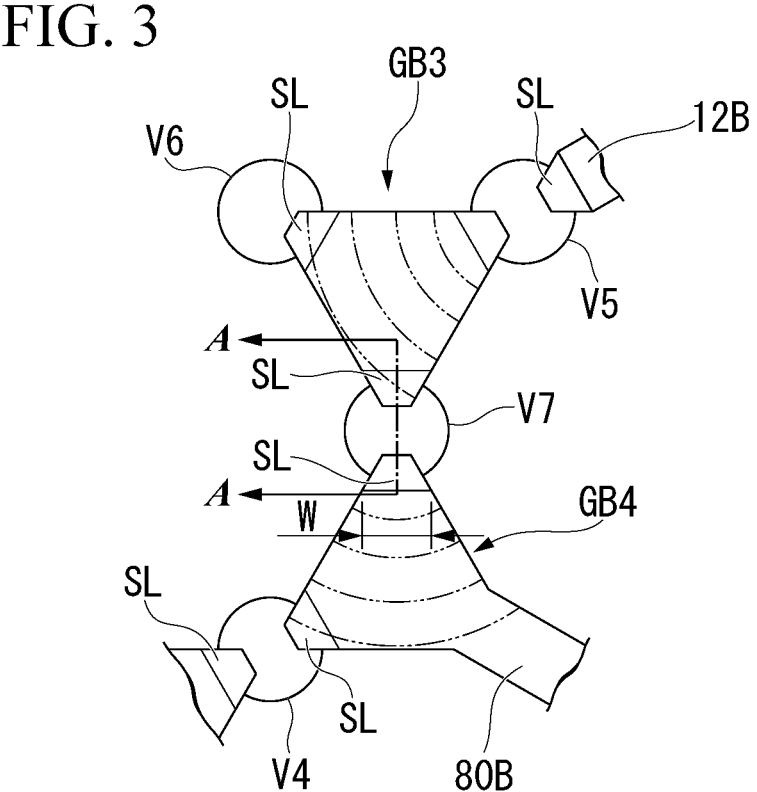
FIG. 3 is a partial plan view schematically showing the fluidic device of the embodiment.

As shown in FIG. 3, each merging/branching portion GB1 to GB5 is a space having an upper face and a bottom face of a substantially equilateral triangle. Here, the substantially equilateral triangle means that the longest three sides each form 60 degrees.

Figure 11:
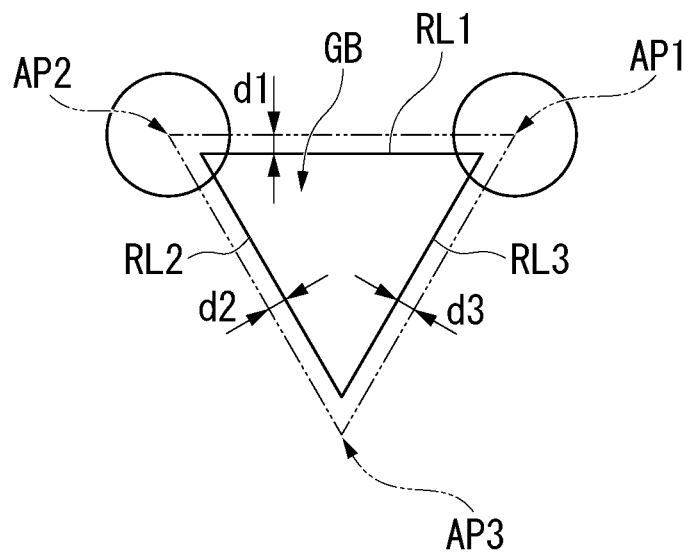
FIG. 11 is a diagram showing a modified example of the merging/branching portion.
Figure 12:
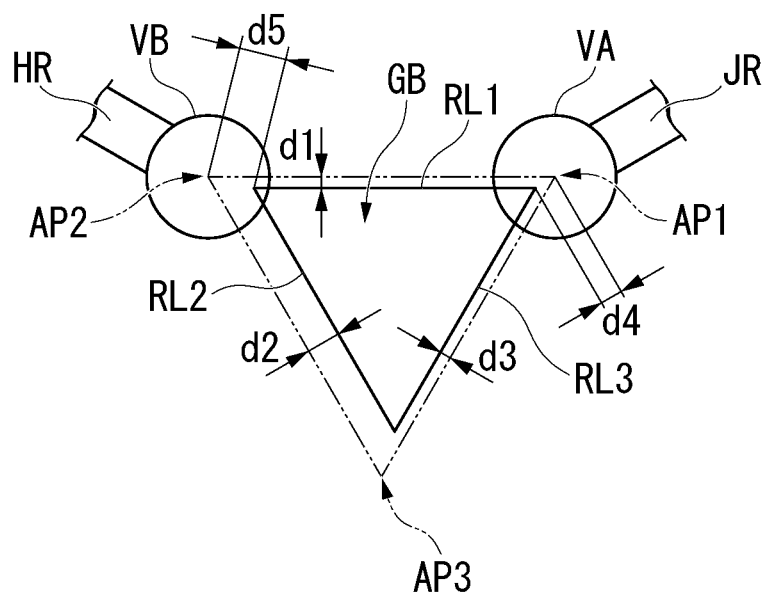
FIG. 12 is a diagram showing a modified example of the merging/branching portion.

The longest three sides of the merging/branching portions GB1 to GB5 are line segments that overlap or are parallel to each side of the equilateral triangle indicated by the alternate long and two short dash lines connecting the vertices AP1, AP2, and AP3 shown in FIGS. 11 and 12. A valve that regulates the flow of fluid in the flow path 11 is provided at a position of at least two vertices of the equilateral triangle. The vertices AP1 and AP2 at which the valve is disposed and the center of the valve coincide with each other (details will be described later). Hereinafter, at each merging/branching portion, the equilateral triangle corresponding to the equilateral triangle connecting the vertices AP1, AP2, and AP3 in FIGS. 11 and 12 is referred to as a "reference equilateral triangle."

Among the contours of the upper and bottom faces of the merging/branching portions GB1 to GB5 of the present embodiment, the three longest sides may overlap each side of the equilateral triangle deviated by a predetermined distance inside the reference equilateral triangle. The magnitude of this deviation is called an offset amount. The offset amount may be the same or different for each side of the equilateral triangle. Details will be described later.

The upper face and the bottom face constituting the merging/branching portions GB1 to GB5 are equilateral triangles of the same size, and completely overlap in the stacking direction.

The upper face and the bottom face constituting the merging/branching portions GB1 to GB5 are equilateral triangles whose upper face is larger than the bottom face, and the small equilateral triangle which is the bottom face in the stacking direction may be configured to be disposed inside the large equilateral triangle which is the upper face. At this time, the side faces constituting the merging/branching portions GB1 to GB5 incline in an inward direction from the upper face to the bottom face.

That is, the merging/branching portions GB1 to GB5 are formed by a recess surrounded by a contour that matches the line segment connecting the vertex positions of the reference equilateral triangle (hereinafter simply referred to as the vertex position), or a contour parallel to each line segment, in the plan view (stacking direction view (thickness direction view of the second substrate 9)). Each of the merging/branching portions GB1 to GB5 of the present embodiment has a contour that matches the line segment connecting the apex positions. The lengths of the sides of the equilateral triangles constituting the merging/branching portions GB1 to GB5 are substantially the same.

Each of the merging/branching portions GB1 to GB5 has an equilateral triangular upper face and bottom face parallel to the upper face 9b of the second substrate 9, and side faces orthogonal to the upper face and bottom face. Therefore, the contour in the plan view of the merging/branching portions GB1 to GB5 is formed by a ridge line on which the upper face 9b and the side face of the second substrate 9 intersect. Here, the contour refers to a boundary line at the merging/branching portion, and the merging/branching portion is a region surrounded by a plurality of contours (ridges). The ridges are not limited to straight lines, and may be curved lines.

In the merging/branching portions GB1 to GB5, for example, it is possible to inflow and merge the solution from the flow path connected to the two vertex positions and send it to the flow path connected to the other vertex position. Further, it is possible to branch the solution introduced from the flow path connected to one vertex position into the flow path connected to the other two vertex directions. Further, for example, by introducing a solution from the flow path with the valve between the flow path connected to one vertex position and the merging and branching portion open and closing the valve, it is possible to carry out a quantification compartment of the solution for the volume of the merging and branching portion.

A plurality of valves V1 to V8 (eight in the example of FIG. 2) are provided in the path of the circulation flow path 10. The valves V1 and V2 are disposed at two apex positions of the three apex positions constituting the merging/branching portion GB1. The valves V3 and V4 are disposed at two apex positions of the three apex positions constituting the merging/branching portion GB2. The valves V5 to V7 are disposed at three apex positions constituting the merging/branching portion GB3, respectively. The valves V4 and V7 are disposed at two apex positions of the three apex positions constituting the merging/branching portion GB4. The valves V2 and V8 are disposed at two apex positions of the three apex positions constituting the merging/branching portion GB5.

The center positions of the valves V1 to V8 and the apex positions of the reference equilateral triangles of the merging/branching portions GB1 to GB5 are disposed at positions selected from the predetermined number of index points disposed in the two-dimensional hexagonal lattice pattern. The merging/branching portion GB1 and the merging/branching portion GB5 have one of the apex positions of a reference equilateral triangle at the same position, and the valve V2 is disposed at the same position. The merging/branching portion GB2 and the merging/branching portion GB4 have one of the apex positions of a reference equilateral triangle at the same position, and the valve V4 is disposed at the same position. The merging/branching portion GB3 and the merging/branching portion GB4 have one of the apex positions of a reference equilateral triangle at the same position, and the valve V7 is disposed at the same position.

Further, the valves V1 to V4 and V7 to V8 divide the circulation flow path 10 into a plurality of (two in the example of FIG. 2) quantification compartments 18A and 18B. Specifically, the quantification compartment 18A including a G-shaped transfer flow path 80A provided with the merging/branching portions GB1 and GB2 and the pump P is partitioned by valves V1 to V4. The transfer flow path 80B connecting the apex positions of the merging/branching portions GB4 and GB5 and an hourglass-shaped quantification compartment 18B including the merging/branching portions GB4 and GB5 are partitioned by valves V2, V4, V7 to V8. The valves V1 to V4 and V7 to V8 are disposed so that the respective quantification compartments 18A and 18B have a predetermined volume.

The merging/branching portions GB1 and GB2 of the quantification compartment 18A are connected to the merging/branching portions GB4 and GB5 of the quantification compartment 18B via valves V2 and V4. Further, the merging/branching portion GB1 of the quantification compartment 18A is connected to the introduction flow path 12A via the valve V1. The merging/branching portion GB2 of the quantification compartment 18A is connected to the discharge flow path 13A via a valve V3.

The merging/branching portion GB4 of the quantification compartment 18B is connected to the merging/branching portion GB3 via the valve V7. The merging/branching portion GB3 is connected to the introduction flow path 12B via the valve V5. Further, the discharge flow path 13B is connected to the merging/branching portion GB5 of the quantification compartment 18B via the valve V8.

The introduction flow paths 12A and 12B are flow paths for introducing the solution into the quantification compartments 18A and 18B of the circulation flow path 10. The introduction flow paths 12A and 12B are provided for each of the quantification compartments 18A and 18B of the circulation flow path 10. The introduction flow path 12A is connected to the supply hole 39A on one end side. Further, the introduction flow path 12A is connected to the valve V1 on the other end side. The introduction flow path 12B is connected to the supply hole 39B on one end side. Further, the introduction flow path 12B is connected to the valve V5 on the other end side.

The discharge flow paths 13A and 13B are flow paths for discharging the solutions of the quantification compartments 18A and 18B of the circulation flow path 10 to the waste liquid tank 7. The discharge flow paths 13A and 13B are provided for each of the quantification compartments 18A and 18B of the circulation flow path 10. The discharge flow path 13A is connected to the discharge hole 37A on one end side. Further, the discharge flow path 13A is connected to the valve V3 on the other end side. The discharge flow path 13B is connected to the discharge hole 37B on one end side. Further, the discharge flow path 13B is connected to the valve V8 on the other end side.

Figure 4:
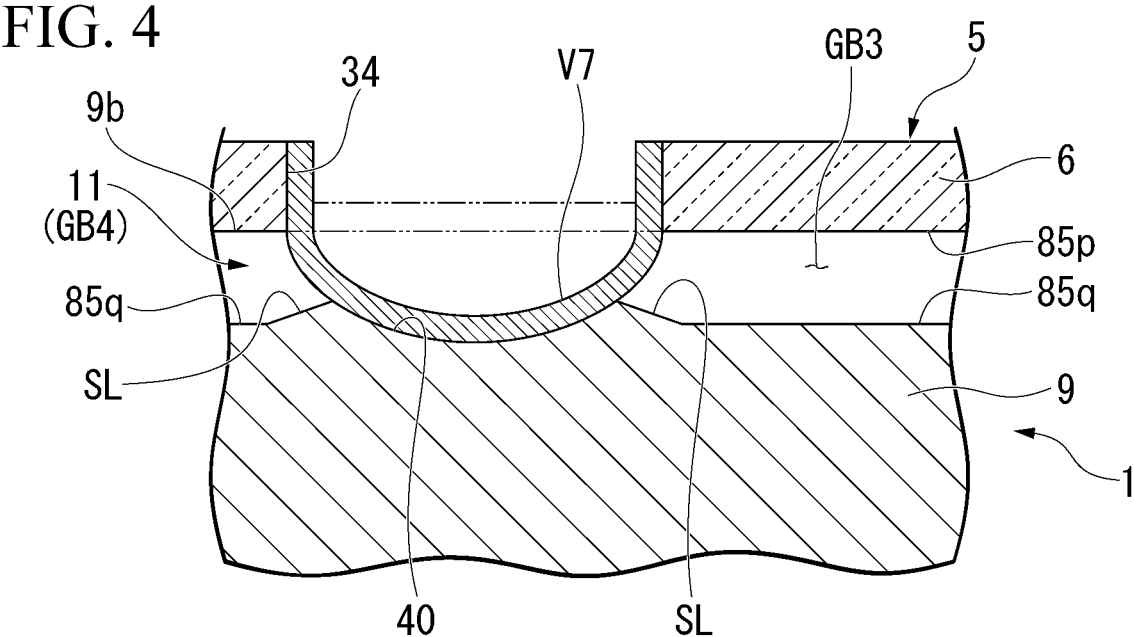
FIG. 4 is a cross-sectional view taken along a line A-A of a base material 5 in FIG. 3.

FIG. 3 is an enlarged partial plan view of the merging/branching portions GB3 and GB4. FIG. 4 is a cross-sectional view taken along line A-A of the base material 5 in FIG. 3. Although the structures of the merging/branching portions GB3, GB4 and the valve V7 are shown here as representatives, the merging/branching portions GB1, GB2, GB5 and the valves V1 to V6 and V8 also have the same configuration.

First, the structure of the valve V7 will be described.

The first base material 6 is provided with a valve holding hole 34 for holding the valve V7. The valve V7 is held by the first base material 6 in the valve holding hole 34. The valve V7 is made of an elastic material. Examples of the elastic material that can be used for the valve V7 include rubber, an elastomer resin or the like. A hemispherical recess 40 is provided in the flow path 11 directly below the valve V7. As shown in FIG. 4, the valve V7 elastically deforms downward to change the cross-sectional area of the flow path, thereby adjusting the flow of the solution in the flow path 11. The valve V7 elastically deforms downward and comes into contact with the recess 40 to close the flow path 11. Further, the valve V7 opens the flow path 11 by separating from the recess 40 (a virtual line (alternate long and two short dashes line) of FIG. 4).

On a bottom face 85$q$ of the merging/branching portions GB3 and GB4, an inclined portion SL that is located at the boundary between the valve V7 (recess 40) and the merging/branching portions GB3 and GB4, and decreases a distance from the upper face 85$p$ toward the valve V7 is provided. By providing the inclined portion SL, for example, as compared with a case where the inclined portion SL is not provided and there is a step (corner) at the boundary between the bottom part of the recess 40 and the bottom face 85$q$ of the merging/branching portions GB3 and GB4, the solution can be smoothly introduced into the valve V7, and the residual air bubbles in the step (corner) can be effectively suppressed. Further, for example, when the solution is caused to flow from the merging/branching portion GB3 to the merging/branching portion GB4 via the valve V7, before the solution reaches the edge portion connecting the valve V4 and the transfer flow path 80B, the solution can be quickly filled in the valve V7.

The above-mentioned inclined portion SL is also provided at the boundary between the introduction flow paths 12A and 12B and the recess 40, and the boundary between the discharge flow paths 13A and 13B and the recess 40.

The inclined portion SL is particularly effective when the flow path 11 is flat and has lyophilic property to the solution. The flatness of the flow path 11 means that the depth of the flow path 11 is smaller than the width of the flow path 11.

Further, in a plan view, the merging/branching portions GB3 and GB4 have a tapered shape in which the diameter is reduced at an angle of 60° toward the center of the valve V7. The maximum width W of the inclined portion SL in the tapered shape is preferably about 0.5 to 1.5 mm. The recess 40 has a circular shape in a plan view on the upper face 9$b$ of the second base material 9. The diameter of the recess 40 on the upper face 9$b$ is, for example, preferably 1.0 to 3.0 mm.

(Procedure for Supplying Solution from Reservoir to Flow Path)

Next, the procedure for supplying the solution S from the reservoir 29 to the flow path 11 in the fluidic device 1 will be described.

As shown in FIG. 1, the reservoir 29 is filled with the solution S in advance. In the measurement using the fluidic device 1, first, the solution S in the reservoir 29 is moved to the flow path 11. More specifically, the solution S is sequentially introduced from the reservoir 29 into the respective quantification compartments 18A and 18B of the circulation flow path 10.

The opening and closing of valves V1 to V8 when the solution S is introduced into the quantification compartment 18A will be described on the basis of FIG. 2. First, the valves V2 and V4 located on both sides in the longitudinal direction of the quantification compartment 18A into which the solution S is introduced are closed. Further, the valve V3 connected to the quantification compartment 18A and the discharge flow path 13A is opened. Further, the valve V1 connected to the quantification compartment 18A and the introduction flow path 12A is opened.

The procedure for moving the solution from the reservoir 29 to the flow path 11 will be described on the basis of FIG. 1. Negative pressure suction is performed in the waste liquid tank 7 from the air hole 35, using a suction device (not shown). As a result, the solution S in the reservoir 29 moves to the flow path 11 side via the supply hole 39A. Further, air having passed through the injection hole 32A is introduced behind the solution S of the reservoir 29. As a result, the solution S stored in the reservoir 29 is introduced into the quantification compartment 18A of the circulation flow path 10 via the supply hole 39A and the introduction flow path 12A.

When the solution S is introduced into the quantification compartment 18B, the valve V6 is closed in addition to the valves V2 and V4 and the valves V5 and V7 are opened. Further, the valve V8 connected to the quantification compartment 18B and the discharge flow path 13B is opened. Further, the valve V5 connected to the quantification compartment 18B and the introduction flow path 12B is opened.

Further, the negative pressure suction is performed in the waste liquid tank 7 from the air hole 35, using a suction device. As a result, the solution S in the reservoir 29 moves to the flow path 11 side via the supply hole 39B. Further, air having passed through the injection hole 32B is introduced behind the solution S of the reservoir 29. As a result, the solution S stored in the reservoir 29 is introduced into the quantification compartment 18B of the circulation flow path 10 via the supply hole 39B and the introduction flow path 12B.

For example, when the solution S is introduced into the quantification compartment 18B, the solution S introduced from the introduction flow path 12B into the merging/branching portion GB3 via the valve V5 is introduced into the merging/branching portion GB4 via the valve V7, and is introduced into the merging/branching portion GB5 via the transfer flow path 80B.

Here, since the above-mentioned inclined portion SL is provided at the boundary between the introduction flow path 12B and the valve V5, the solution can be smoothly introduced into and filled into valve V5, in a state in which the residual air bubbles are suppressed at the boundary between the introduction flow path 12B and the valve V5 (recess 40). Further, since the merging/branching portion GB3 is formed in an equilateral triangle in a plan view and the distances from the valve V5 (recess 40) to the valves V6 and V7 are the same, the solution introduced into the merging/branching portion GB3 from the valve V5 can reach the valves V6 and V7 at almost the same time, as shown by the alternate long and two short dash lines in FIG. 3.

Therefore, for example, it is possible to suppress a situation in which the solution having reached the valve V7 first flows into the merging/branching portion GB4 and air bubbles remain in the vicinity of the valve V6.

Also for the solution introduced from the merging/branching portion GB3 to the merging/branching portion GB4 via the valve V7, because an inclined portion SL is provided at the boundary between the merging/branching portion GB3 and the valve V7, the solution can be smoothly introduced into the valve V7 and filled, while suppressing the residual air bubbles at the boundary between the merging/branching portion GB3 and the valve V7. Further, the solution introduced from the valve V7 into the merging/branching portion GB4 reaches the valve V4 and the transfer flow path 80B almost at the same time.

Therefore, for example, it is possible to suppress a situation in which the solution having reached the transfer flow path 80B first flows from the transfer flow path 80B to the merging/branching portion GB5, and air bubbles remain in the vicinity of the valve V4.

Since the solution introduced from the transfer flow path 80B into the merging/branching portion GB4 also reaches the valves V2 and V8 from the transfer flow path 80B almost at the same time, it is possible to suppress a situation in which air bubbles remain in one of the valves V2 and V8.

When the solution is introduced into the quantification compartment 18A, the solution is quantified in the quantification compartment 18A in a state in which the residual air bubbles are suppressed by closing the valves V1 and V3. When the solution is introduced into the quantification compartment 18B, the solution is quantified in the quantification compartment 18B in a state in which the residual air bubbles are suppressed by closing the valves V7 and V8.

(Procedure for Mixing Solution in Flow Path)

Next, the procedure for mixing the solution supplied to the flow path of the fluidic device 1 will be described on the basis of FIG. 2. First, the valves V2 and V4 are opened in a state in which the solution is introduced (quantified) into the respective quantification compartments 18A and 18B of the circulation flow path 10 as described above. Further, the solution in the circulation flow path 10 is sent and circulated, using the pump P. In the solution circulating in the circulation flow path 10, the flow rate around the wall face is slow and the flow rate at the center of the flow path is high due to an interaction (friction) between the flow path wall face in the flow path and the solution. As a result, since the flow rate of the solution can be distributed, the mixing and reaction of the solutions each quantified in the quantification compartments 18A and 18B are promoted.

As described above, in the fluidic device 1 of the present embodiment, since the merging/branching portions GB1 to GB5 at which the solutions are merged or branched are formed by being surrounded by a line segment connecting the apex positions of the equilateral triangles, and the inclined portion SL is provided at the boundary between the merging/branching portions GB1 to GB5 and the valves V1 to V8, it is possible to suppress an occurrence of air bubbles remaining at the boundary between the merging/branching portions GB1 to GB5 and the valves V1 to V8. At the same time, since the solution introduced from one of the apex positions of the equilateral triangle reaches the other apex positions almost at the same time, it is possible to suppress the occurrence of air bubble residue at one of the other apex positions.

Therefore, in the fluidic device 1 of the present embodiment, the solution can be quantified with high accuracy in each of the quantification compartments 18A and 18B, without being affected by air bubbles. As a result, in the fluidic device 1 of the present embodiment, it is possible to perform high-precision measurement, using the solution that is quantified in the quantification compartments 18A and 18B.

[Relationship Between Maximum Width of Inclined Portion SL and Residual Air Bubbles]

Next, a relationship between the maximum width of the inclined portion SL and the residual air bubbles in the merging/branching portions GB1 to GB5 and the flow path 11 will be described.

Figure 5:
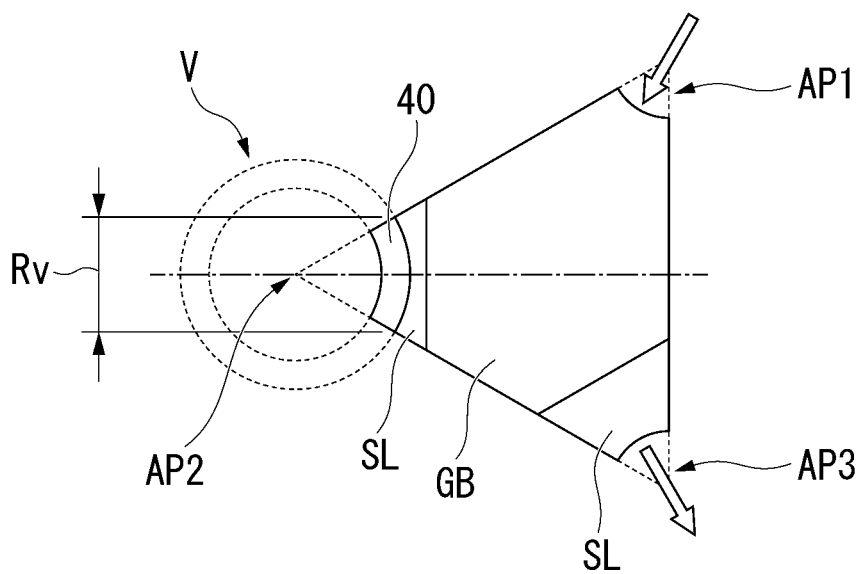
FIG. 5 is a plan view representatively showing one of merging/branching portions GB1 to GB5 as a merging/branching portion GB.

FIG. 5 is a plan view representatively showing one of the merging/branching portions GB1 to GB5 as a merging/branching portion GB.

As shown by the arrows, in the merging/branching portion GB shown in FIG. 5, the solution flows in from the apex position AP1 and the solution flows out of the apex position AP3. A valve V and a recess 40, which are representatively shown, are disposed at positions overlapping another vertex position AP2.

Figure 6:
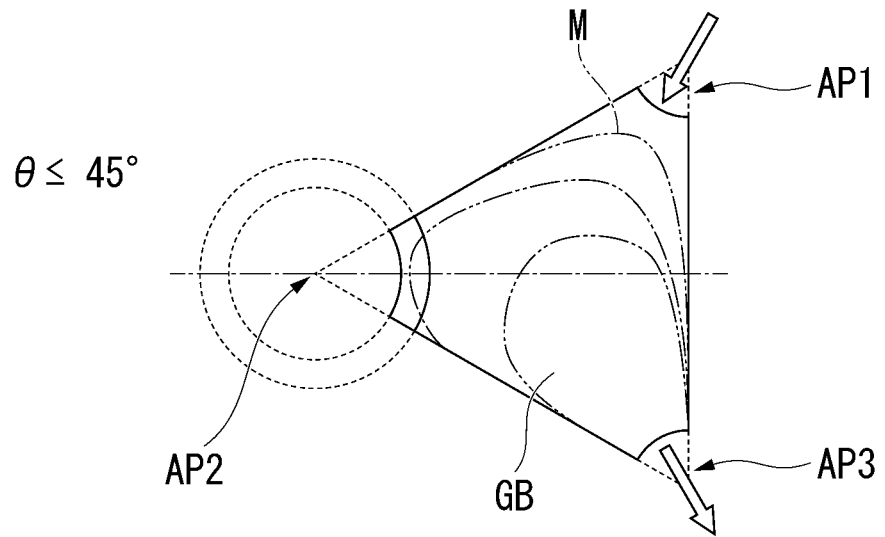
FIG. 6 is a diagram showing an example of a trajectory of a meniscus M of the solution when the merging/branching portion GB has a high lyophilic property at a contact angle θ to the solution of 45° or less.

FIG. 6 is a diagram showing an example of the trajectory of the meniscus M of the solution when the merging/branching portion GB (second base material 9) has a high lyophilic property at a contact angle θ to the solution of 45° or less. As shown in FIG. 6, since the merging/branching portion GB has the high lyophilic property, an end portion of the meniscus M of the solution flowing into the merging/branching portion GB from the apex position AP1 proceeds along the side edge of the merging/branching portion GB and reach the apex position AP2 ahead of the central portion of the meniscus M. After that, the solution flows out of the apex position AP3 in a state in which the meniscus M wraps around the merging/branching portion GB. In this case, due to the high lyophilic property of the merging/branching portion GB, since the end portion of the meniscus M of the solution reaches the apex position AP2 in advance, air bubbles do not remain even when the inclined portion SL is not provided at the apex position AP2.

Figure 7:
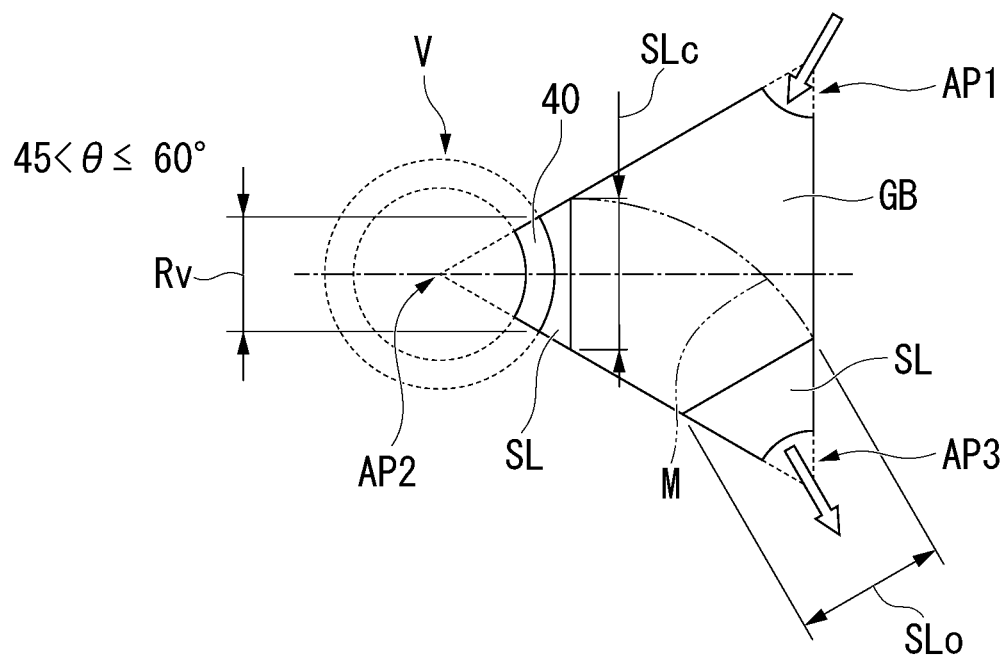
FIG. 7 is a diagram showing an example of the trajectory of the meniscus M of the solution when the merging/branching portion GB has a low lyophilic property at a contact angle θ to the solution exceeding 45° and 60° or less.

FIG. 7 is a diagram showing an example of the trajectory of the meniscus M of the solution when the merging/branching portion GB (second base material 9) has a contact angle θ to the solution exceeding 45° and 60° or less and having low lyophilic property. As shown in FIG. 7, because the merging/branching portion GB has low lyophilic property, the meniscus M of the solution flowing into the merging/branching portion GB from the apex position AP1 has a concave shape in which a central portion is recessed to the end portion. In this case, the meniscus M of the solution needs to reach the inclined portion SL of the apex position AP2 or the valve V rather than the inclined portion SL of the apex position AP3. Therefore, the maximum width of the inclined portion SL of the apex position AP2 or the maximum width of the valve V exposed at the merging/branching portion GB of the apex position AP2 is set with respect to the maximum width of the inclined portion SL of the apex position AP3 such that the distance from the apex position AP1 to the inclined portion SL of the apex position AP2 or the distance to the valve V is shorter than or the same as the distance from the apex position AP1 to the inclined portion SL of the apex position AP3.

Specifically, when the maximum width of the inclined portion SL at the apex position AP3 is defined as SLo, the maximum width of the inclined portion SL at the apex position AP2 is defined as SLc, and the maximum width at which the valve V is exposed at the merging/branching portion GB of the apex position AP2 is defined as Rv, one of the following formulas (1) and (2) may be satisfied.

$$SLc \geq SLo \tag{1}$$

$$Rv \geq SLo \tag{2}$$

When satisfying either of the formulas (1) and (2), no residual air bubbles occurs at the apex position AP2.

Figure 8:
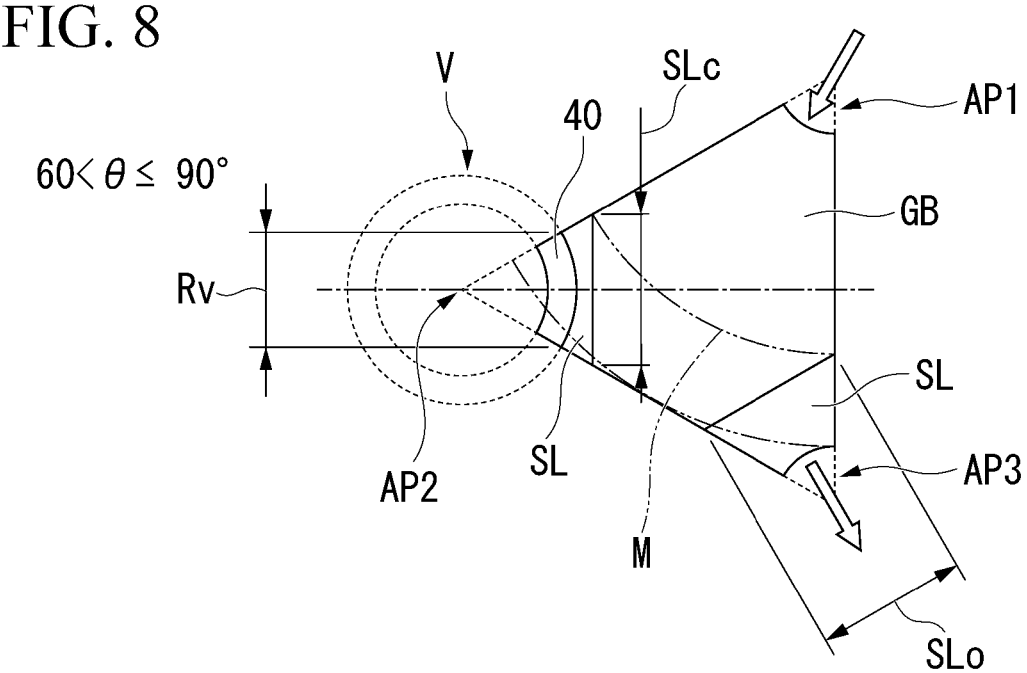
FIG. 8 is a diagram showing an example of the trajectory of the meniscus M of the solution when the merging/branching portion GB has a liquid repellent property at the contact angle θ to the solution exceeding 60° and 90° or less.

FIG. 8 is a diagram showing an example of the trajectory of the meniscus M of the solution when the merging/branching portion GB (second base material 9) has a liquid repellent property at the contact angle θ to the solution exceeding 60° and 90° or less. As shown in FIG. 8, because the merging/branching portion GB has liquid repellent property, the meniscus M of the solution flowing into the merging/branching portion GB from the apex position AP1 has a convex shape in which a central portion bulges with respect to the end portion. In this case, similarly to the merging/branching portion GB shown in FIG. 7, one of the formulas (1) and (2) is satisfied, the meniscus M of the solution needs to reach the inclined portion SL of the apex position AP2 or the valve V rather than the inclined portion SL of the apex position AP3, and in addition, before the meniscus M of the solution reaches the side (opposite side) of the merging/branching portion GB of the equilateral triangle facing the apex position AP1, the end portion of the meniscus M needs to reach the inclined portion SL of the apex position AP2 or the valve V. Before the meniscus M of the solution reaches the side (opposite side), in order for the end portion of the meniscus M to reach the inclined portion SL of the apex position AP2 or the valve V, the length of the side of the merging/branching portion GB needs to satisfy either of the following formulas (3) and (4).

$$\left[ SL_c \geq \left( 1 - \frac{\sqrt{3}\sin\left(\frac{2}{3}\pi - \frac{\theta}{2}\right)}{2\sin\left(\frac{5}{6}\pi - \frac{\theta}{2}\right)} \right) L \right] \tag{3}$$

$$\left[ Rv \geq \left( 1 - \frac{\sqrt{3}\sin\left(\frac{2}{3}\pi - \frac{\theta}{2}\right)}{2\sin\left(\frac{5}{6}\pi - \frac{\theta}{2}\right)} \right) L \right] \tag{4}$$

By satisfying any of the formulas (1) and (2) and any of the formulas (3) and (4), no residual air bubbles occurs at the apex position AP2.

EXAMPLE

The residual air bubbles when introducing the solution into the quantification compartment 18B shown in FIG. 2 via the valve V7 were analyzed. Water having a density: 998.22 (kg/m$^3$), a viscosity coefficient: 1.004e-3 (Pa·s), a surface tension: 0.07275 (N/m), and a contact angle: 89.1 (deg) was used as the solution, and the flow rate was set to 200 (4/min). The analysis samples were set as Samples 1 to 4 by setting the maximum width W of the inclined portion SL and the depths of the merging/branching portions GB4 and GB5 according to the specifications shown in [Table 1]. Regarding the maximum width W of the inclined portion SL, the inclined portion SL of the boundary between the merging/branching portion GB4 and the valve V7 (hereinafter referred to as the inclined portion SL in the valve V7), and the inclined portion SL of the boundary between the merging/branching portion GB5 and the valve V2 (hereinafter, referred to as the inclined portion SL in the valve V2) was set to the same width.

Further, the maximum width W of the inclined portion SL of the boundary between the merging/branching portion GB4 and the valve V4 (hereinafter referred to as the inclined portion SL in the valve V4), and the maximum width W of the inclined portion SL of the boundary between the merging/branching portion GB5 and the valve V8 (hereinafter referred to as the inclined portion SL in the valve V8) was set to the same width. For Samples 1 to 4, the residual amount of solution (μL) and residual air bubbles (μL) at the merging/branching portions GB4 and GB5 were determined.

TABLE 1

|  | Sample 1 | Sample 2 | Sample 3 | Sample 4 |
| --- | --- | --- | --- | --- |
| Maximum width SLo (mm) of inclined portion SL in valves V2, V7 | 1.0 | 0.5 | 1.0 | 1.0 |
| Maximum width SLo (mm) of inclined portion SL in valves V4, V8 | 0.0 | 0.0 | 1.0 | 0.0 |
| Depth (mm) of merging/branching portions GB4, GB5 | 0.3 | 0.3 | 0.3 | 0.2 |
| Maximum width Rv (mm) at which valves V are exposed in valves V4, V8 | 0.729 | 0.729 | 0.729 | 0.729 |
| Length (mm) of side of merging/branching portions GB4, GB5 | 3.48 | 3.48 | 3.48 | 3.48 |
| Solution contact angle (deg) | 89.1 | 89.1 | 89.1 | 89.1 |
| Right side of formulas (3), (4) | 0.45352 | 0.45352 | 0.45352 | 0.45352 |
| Formula (1) | x | x | ○ | x |
| Formula (2) | x | ○ | x | x |
| Formula (1) or Formula (2) | x | ○ | ○ | x |
| Formula (3) | x | x | ○ | x |
| Formula (4) | ○ | ○ | ○ | ○ |
| Formula (3) or Formula (4) | ○ | ○ | ○ | ○ |
| (Formula (1) or Formula (2)) and (Formula (3) or Formula (4)) | x | ○ | ○ | x |
| Solution residual amount (μL) | 3.0 | 3.1 | 3.0 | 2.0 |
| Residual air bubbles (μL) | 0.24 | 0.00 | 0.00 | 0.13 |
| Residual air bubbles/Solution residual amount (%) | 8.00% | 0.00% | 0.00% | 6.50% |

As is clear from Table 1, residual air bubbles occurred in Samples 1 and 4, and no residual air bubble occurred in Samples 2 and 3.

[System]

Next, a system SYS including the aforementioned fluidic device 1 will be described with reference to FIGS. 9 and 10.

Figure 9:
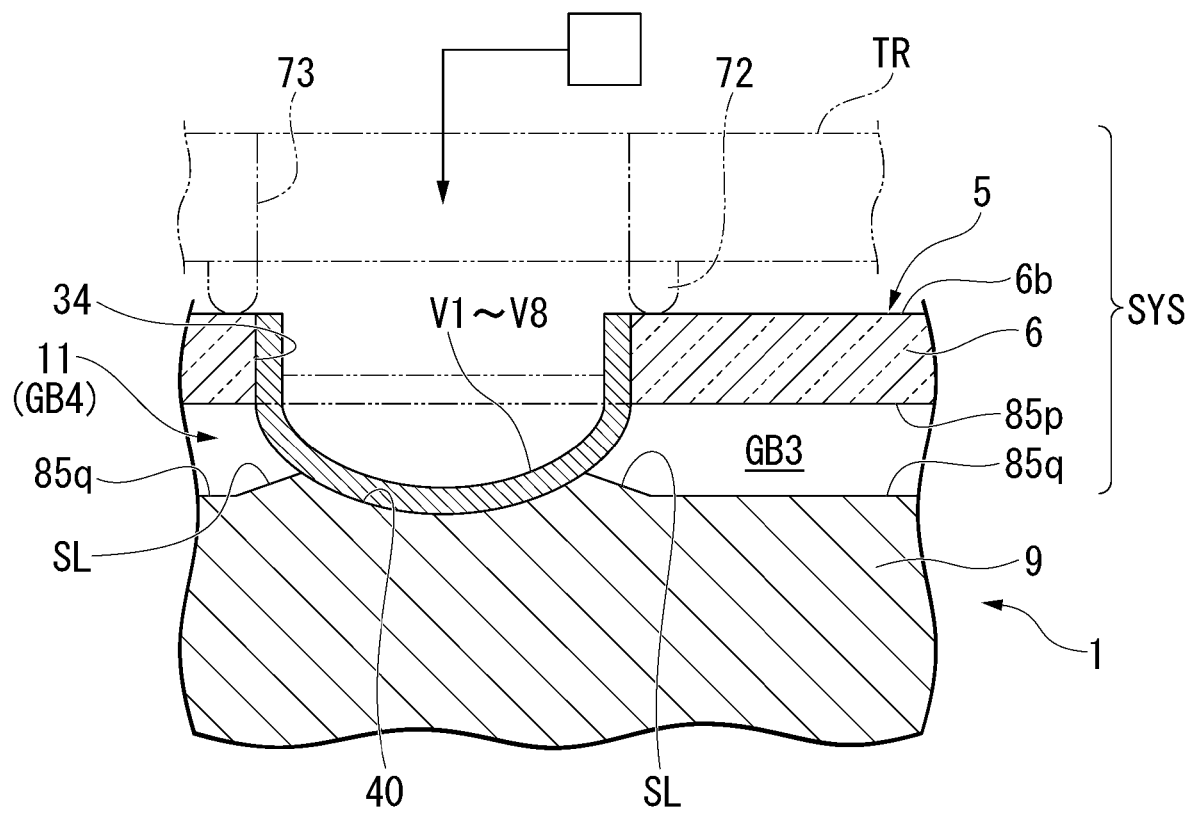
FIG. 9 is a cross-sectional view showing a basic configuration of the system SYS of an embodiment.

FIG. 9 is a cross-sectional view showing a basic configuration of the system SYS.

The system SYS includes the above-mentioned fluidic device 1 and a drive unit TR. The fluidic device 1 is used by being set in the drive unit TR. The drive unit TR is formed in a plate shape, and when the fluidic device 1 is set, the drive unit TR is disposed to face the upper face 6b of the first base material. The drive unit TR has a contact portion 72 that comes into contact with the upper face 6b of the first base material 6 when the fluidic device 1 is set. The contact portion 72 is formed in an annular shape that surrounds the valve holding hole 34. When the contact portion 72 comes into contact with the upper face 6b of the first base material 6, the contact portion 72 can airtightly seal together the contact portion 72 and the upper face 6b.

The drive unit TR has a drive fluid supply hole (supply unit) 73 that supplies the drive fluid to the valves V1 to V8 of the fluidic device 1. A drive fluid (for example, air) is supplied to the drive fluid supply hole 73 from a fluid supply source D. The drive fluid is a force for deforming valves V1 to V8.

Figure 10:
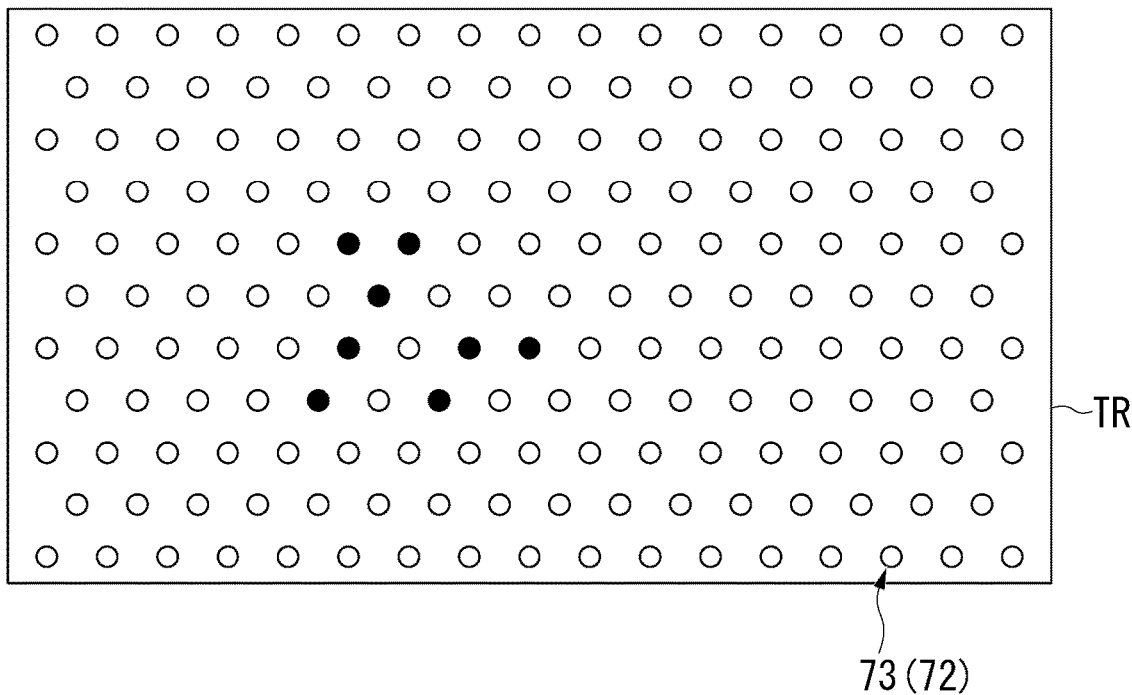
FIG. 10 is a plan view showing a drive unit TR of the system SYS of the embodiment.

FIG. 10 is a plan view of the drive unit TR. As shown in FIG. 10, the drive unit TR has a plurality of contact portions 72 and drive fluid supply holes 73. The drive fluid can be independently supplied to each drive fluid supply hole 73 from the fluid supply source D. A predetermined number (182 in FIG. 10) of the contact portions 72 and the drive fluid supply holes 73 are arranged in a two-dimensional hexagonal lattice pattern. The center positions of the valves V1 to V8 in the fluidic device 1 are disposed at positions (positions shown in black in FIG. 10) selected from the contact portions 72 and the drive fluid supply holes 73 disposed in a two-dimensional hexagonal lattice pattern.

In the system SYS having the aforementioned configuration, when the fluidic device 1 is set in the drive unit TR, and the drive fluid is supplied from the fluid supply source D in response to the opening and closing of the valves V1 to V8 described above, the solution can be introduced into the quantification compartments 18A and 18B, and the solution can be mixed in the circulation flow path 10.

In the system SYS of the present embodiment, as described above, by disposing the valve of the fluidic device 1 at a position selected from the contact portions 72 and the drive fluid supply holes 73 disposed in the two-dimensional hexagonal lattice pattern, it is possible to easily provide the merging/branching portion surrounded by a line segment connecting the apex positions of the equilateral triangle. Therefore, in the system SYS of the present embodiment, it is possible to design an optimal flow path capable of suppressing the occurrence of air bubbles when the solution is introduced depending on the measurement (inspection) target, without being limited to the arrangement and number of the flow paths 11 and the merging/branching portions GB1 to GB5 in the fluidic device 1.

Although the preferred embodiments according to the present invention have been described above with reference to the accompanying drawings, it goes without saying that the present invention is not limited to such examples. The various shapes and combinations of each constituent member shown in the above-mentioned examples are examples, and can be variously changed on the basis of design requirements and the like without departing from the gist of the present invention.

For example, the arrangement and number of the flow paths, the merging/branching portions, and the valves shown in the aforementioned embodiment are examples, and as described above, by disposing the valve (and the merging/branching portion, the flow path) of the fluidic device 1 at the position selected from the contact portions 72 and the drive fluid supply holes 73 disposed in a two-dimensional hexagonal lattice pattern, it is possible to easily cope with various measurement (inspection) targets.

Further, although the configuration in which the centers of the valves V and V1 to V8 are disposed at the apex positions of the equilateral triangles forming the merging/branching portions GB and GB1 to GB5 has been described in the aforementioned embodiment, it is not limited to this configuration as long as the valves are provided in the region including the apex positions of the equilateral triangles. For example, a configuration in which the centers of the valves V and V1 to V8 are disposed eccentrically from the apex positions of the equilateral triangles forming the merging/branching portions GB and GB1 to GB5 may be provided. Even in this case, it is preferable that the maximum width Rv at which the valve is exposed at the merging/branching portion GB of the apex position AP2 satisfies the aforementioned formulas (2) and (4).

When the valve is disposed at the apex position of the equilateral triangle, the merging/branching portion GB may have a shape in which the equilateral triangle is equidistantly offset in a direction in which the area decreases, for example, as shown in FIG. 11. That is, the distances between the line segments connecting the apex positions of the equilateral triangles and the plurality of contours of the merging/branching portions may be the same on all three sides. The offset amounts d1 to d3 are the distances between the contours RL1 to RL3 of the merging/branching portion GB and the line segments connecting the apex positions AP1 to AP3.

In this case, the offset amounts d1 to d3 are preferably 0.1 to 0.2 mm, for example. Since the offset allows a ground plane of an elastomer of a diaphragm member of the valve to be widened, the valve can be sealed more stably. Further, the volume of the branching portion can be finely adjusted by the offset. For example, even if the valve size is common in the plurality of merging/branching portions, the branching portions having different volumes can be obtained by changing the offset amount.

Further, the offset amount may be such that the distance on at least one of the three sides is different from the distance on the other side. For example, as shown in FIG. 12, when the merging/branching portion GB is connected to the circulation flow path JR via the first valve VA at the apex position AP1, and is connected to the non-circulation flow path HR (for example, an introduction flow path or a discharge flow path) via the second valve VB at the apex position AP2, by setting the offset amount to a relationship of d2>d1>d3, a distance d5 between the intersection of the contours RL1 and RL2 intersecting each other in the second valve VB and the center position (apex position AP2) of the second valve VB can be set to be greater than a distance d4 between the intersection of the contours RL1 and RL3 intersecting each other in the first valve VA and the center position (vertex position AP1) of the first valve VA.

When this configuration is adopted, because a liquid contact area of the second valve VB can be made smaller than a liquid contact area of the first valve VA, it is possible to improve the internal pressure resistance of the second valve VB when the solution flows in the circulation flow path JR.

Further, although a configuration in which the merging/branching portions GB4 and GB5 are disposed point-symmetrically around the apex position at which the transfer flow path is connected is shown in the above embodiment, the configuration is not limited to this configuration.

Figure 13:
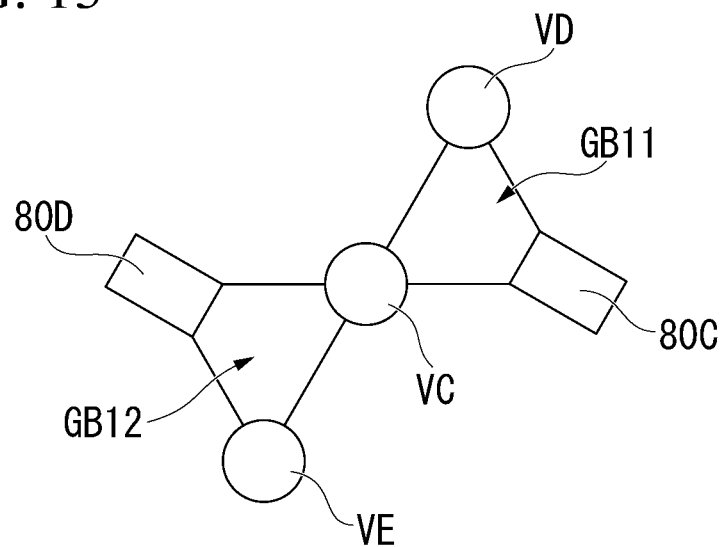
FIG. 13 is a diagram showing a modified example of the merging/branching portion.
Figure 14:
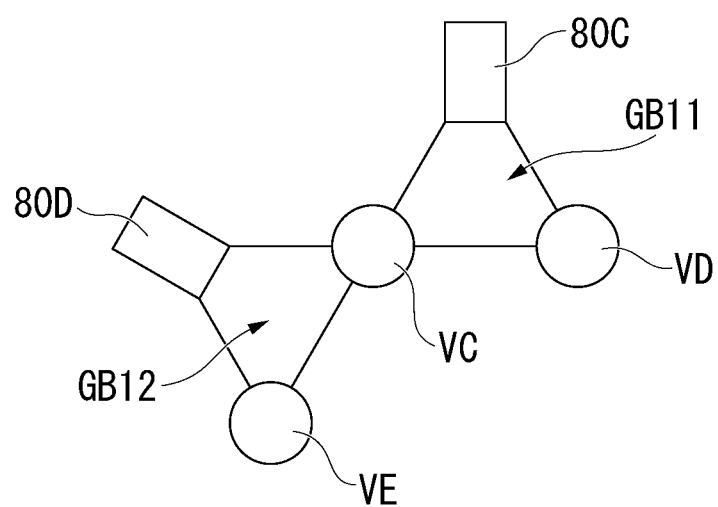
FIG. 14 is a diagram showing a modified example of the merging/branching portion.

For example, as shown in FIG. 13, a configuration in which merging/branching portions GB11 and GB12, transfer flow paths 80C and 80D, and valves VD and VE are disposed point-symmetrically around the apex position at which the valve VC is provided may be provided. Further, as shown in FIG. 14, a configuration in which only the merging/branching portions GB4 and GB5 are disposed point-symmetrically, and the transfer flow paths 80C and 80D and the valves VD and VE are disposed line-symmetrically with respect to a straight line passing through the center of the valve VC may be provided.

Figure 15:
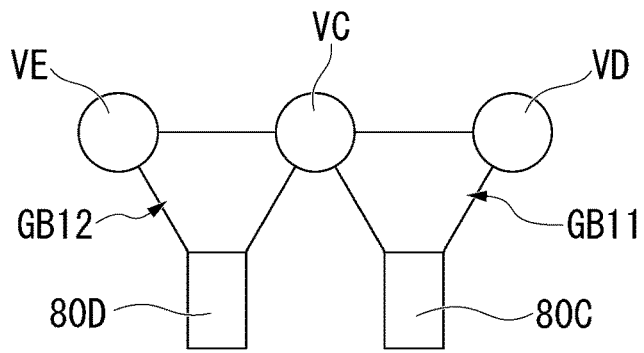
FIG. 15 is a diagram showing a modified example of the merging/branching portion.
Figure 16:
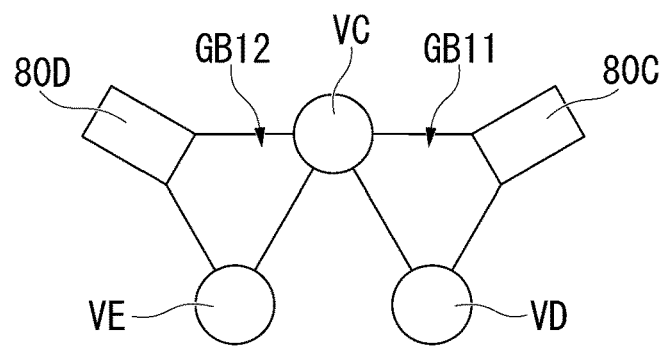
FIG. 16 is a diagram showing a modified example of the merging/branching portion.
Figure 17:
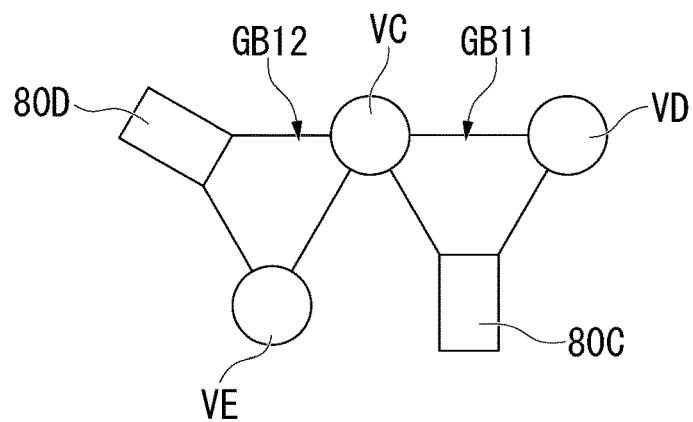
FIG. 17 is a diagram showing a modified example of the merging/branching portion.

Further, as shown in FIGS. 15 and 16, a configuration in which the merging/branching portions GB11 and GB12, the transfer flow paths 80C and 80D, and the valves VD and VE are disposed line-symmetrically around the straight line passing through the apex position at which the valve VC is provided may be provided. Further, as shown in FIG. 17, a configuration in which only the merging/branching portions GB11 and GB12 are disposed line-symmetrically around the straight line passing through the apex position at which the valve VC is provided, and the transfer flow paths 80C and 80D and the valves VD and VE are disposed line-symmetrically may be provided.

While preferred embodiments of the invention have been described and illustrated above, it should be understood that these are exemplary examples of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

DESCRIPTION OF THE REFERENCE SYMBOLS

1 Fluidic device
5 Base material
6 First base material (the other substrate)
9 Second base material (one substrate)
11 Flow path
14 Groove
40 Recess
73 Drive fluid supply hole (supply unit)
80, 80A, 80B Transfer flow path
GB, GB1 to GB5 Merging/branching portion
RL1, RL2, RL3 Contour
S Solution
SL Inclined portion
SYS System
V1 to V8 Valve
VA First valve
VB Second valve

What is claimed is:

1. A fluidic device comprising:
a pair of substrates which are stacked in a thickness direction, one substrate including a flow path formed by being covered with the other substrate,
wherein the flow path includes a merging/branching portion which is surrounded by a contour which is configured to match each line segment connecting together apex positions of an equilateral triangle as viewed in the thickness direction or a contour parallel to each line segment and in which a solution merges or branches, and
a valve which is configured to regulate flow of a fluid in the flow path is provided in at least two of the apex positions.

2. The fluidic device according to claim 1, further comprising:
a second merging/branching portion surrounded by a contour which is configured to match line segments connecting together apex positions of a second equilateral triangle or a contour parallel to each of the line segments,
wherein one of the valves is disposed at an apex position of the second equilateral triangle.

3. The fluidic device according to claim 1, further comprising:
a recess which is provided on the one substrate and on which the deformed valve abuts,
wherein a connecting portion with the recess in the merging/branching portion is inclined from a bottom face of the merging/branching portion toward a joint surface side of the pair of substrates toward the recess.

4. The fluidic device according to claim 3, wherein a width of the connecting portion at the joint surface becomes narrower toward the recess.

5. The fluidic device according to claim 1, wherein a transfer flow path of the solution is connected to at least one of the apex positions.

6. The fluidic device according to claim 1, wherein the valve is placed at each of the apex positions.

7. The fluidic device according to claim 1, wherein a distance between the line segment connecting together the apex positions of the equilateral triangle and the contour is the same on all three sides.

8. The fluidic device according to claim 1, wherein a distance between each line segment connecting together the apex positions of the equilateral triangle and the contour is set such that the distance on at least one side among three sides is different from the distance on another side.

9. The fluidic device according to claim 8, wherein a circulation flow path is connected to a first apex position among the apex positions via a first valve, a non-circulation flow path is connected to a second apex position via a second valve, and a distance between an intersection of the contours intersecting in the second valve and a center position of the second valve is greater than a distance between an intersection of the contours intersecting in the first valve and a center position of the first valve.

10. The fluidic device according to claim 1, wherein the center position of each valve is disposed at a position selected from a predetermined number of index points disposed in a two-dimensional hexagonal lattice pattern.

11. A system comprising:
the fluidic device according to claim 1; and
a supply unit which is able to supply a force for deforming the valve independently for each valve when set in the fluidic device.

12. The system according to claim 11, wherein a predetermined number of the supply units are disposed in a two-dimensional hexagonal lattice pattern, and the valve is disposed at a position selected from the supply units disposed in a predetermined number in the two-dimensional hexagonal lattice pattern.

* * * * *